(12) United States Patent
Bai et al.

(10) Patent No.: US 11,300,709 B2
(45) Date of Patent: Apr. 12, 2022

(54) METHOD FOR DETERMINING SURFACE RUNOFF YIELD IN VEGETATION-COVERED AREA

(71) Applicant: Institute of Geochemistry, Chinese Academy of Sciences, Guiyang (CN)

(72) Inventors: Xiaoyong Bai, Guiyang (CN); Shijie Wang, Guiyang (CN); Luhua Wu, Guiyang (CN); Fei Chen, Guiyang (CN); Miao Zhou, Guiyang (CN); Yichao Tian, Guiyang (CN); Guangjie Luo, Guiyang (CN); Qin Li, Guiyang (CN); Jinfeng Wang, Guiyang (CN); Yuanhuan Xie, Guiyang (CN); Yujie Yang, Guiyang (CN); Chaojun Li, Guiyang (CN); Yuanhong Deng, Guiyang (CN); Zeyin Hu, Guiyang (CN); Shiqi Tian, Guiyang (CN); Qian Lu, Guiyang (CN); Chen Ran, Guiyang (CN); Min Liu, Guiyang (CN)

(73) Assignee: INSTITUTE OF GEOCHEMISTRY, CHINESE ACADEMY OF SCIENCES, Guiyang (CN)

( * ) Notice: Subject to any disclaimer, the term of this patent is extended or adjusted under 35 U.S.C. 154(b) by 113 days.

(21) Appl. No.: 16/862,773

(22) Filed: Apr. 30, 2020

(65) Prior Publication Data
US 2021/0341647 A1 Nov. 4, 2021

(51) Int. Cl.
*G01W 1/14* (2006.01)
*G06F 17/11* (2006.01)
*G01W 1/10* (2006.01)

(52) U.S. Cl.
CPC .............. *G01W 1/14* (2013.01); *G01W 1/10* (2013.01); *G06F 17/11* (2013.01)

(58) Field of Classification Search
CPC ............ G01W 1/14; G01W 1/10; G06F 17/11
See application file for complete search history.

(56) References Cited

U.S. PATENT DOCUMENTS

| 2012/0290140 | A1* | 11/2012 | Groeneveld | A01G 22/00 700/284 |
| 2016/0113215 | A1* | 4/2016 | Layton | A01G 25/16 47/1.01 T |
| 2019/0331832 | A1* | 10/2019 | Chandra | G01W 1/06 |

OTHER PUBLICATIONS

Srikanta Sannigrahi et al, Estimating global ecosystem service values and its response to land surface dynamics during 1995-2015, Journal of Environmental Management Journal, Dec. 28, 2017, pp. 115-131, vol. 223, https://doi.org/10.1016/j.jenvman.2018.05.091.

(Continued)

*Primary Examiner* — Mohammad K Islam
(74) *Attorney, Agent, or Firm* — Tutunjian & Bitetto, P.C.

(57) ABSTRACT

The present invention relates to a method for determining a surface runoff yield in a vegetation-covered area. The present invention improves and integrates a water conservation model with a Zhang's model based on remote sensing data. The present invention constructs a new method for calculating a surface runoff yield in a vegetation-covered area on a spatial pixel scale based on a water balance equation of the vegetation-covered area. This method utilizes real-time dynamic multi-temporal remote sensing data to calculate a vegetation canopy interception water storage, a vegetation litterfall interception water storage, a soil water storage change, a vegetation water conservation, a vegetation evapotranspiration and a vegetation runoff yield. The method realizes the long-term dynamic estimation of the surface runoff yield in regional and global vegetation-covered areas on a spatial pixel scale. It has the advantages of being efficient, fast, accurate, and applicable to large-scale vegetation-covered areas.

7 Claims, 1 Drawing Sheet

(56) References Cited

OTHER PUBLICATIONS

NASA, Global 1-km Gridded Thickness of Soil, Regolith, and Sedimentary Deposit Layers, Feb. 3, 2016, pp. 1-10, https://daac.ornl.gov/SOILS/guides/Global_Soil_Regolith_Sediment.html.

Tomislav Hengl, et al, SoilGrids250m: Global gridded soil information based on machine learning, PLoS One, PLoS One 12(2): e0169748. doi:10.1371/journal.pone.0169748, Feb. 16, 2017, pp. 1-40.

Kamel Didan, et al, Vegetation Index Product Suite User Guide & Abridged Algorithm Theoretical Basis Document, Suomi National Polar-orbiting Partnership Visible Infrared Imaging Radiometer Suite, S-NPP VIIRS VI User Guide—V2.1.1, Vegetation Index and Phenology Lab., Feb. 2018. pp. 1-108.

\* cited by examiner

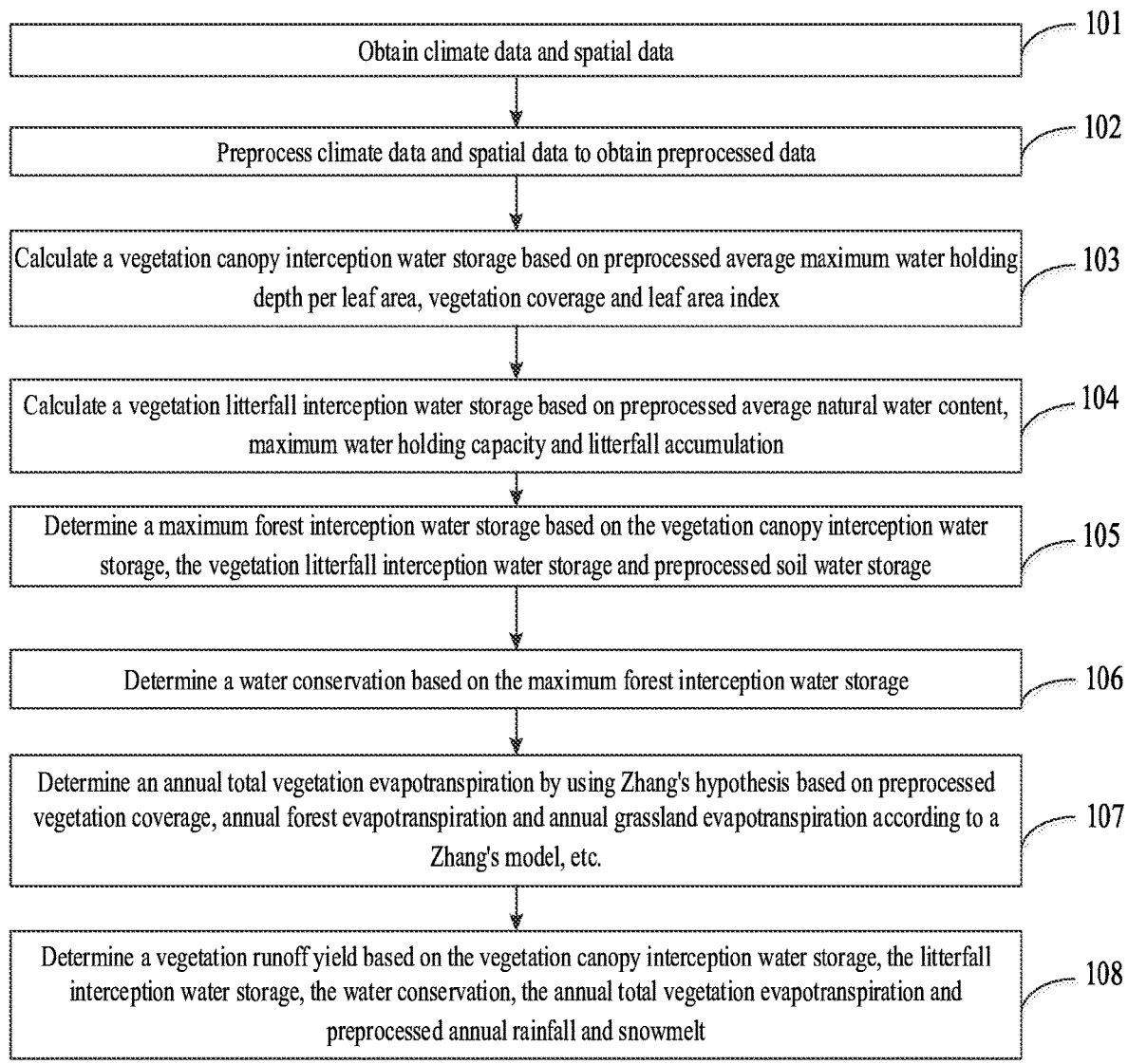

METHOD FOR DETERMINING SURFACE RUNOFF YIELD IN VEGETATION-COVERED AREA

TECHNICAL FIELD

The present invention relates to the field of ecological environment monitoring and surface and groundwater resource utilization, and in particular, to a method for determining a surface runoff yield in a vegetation-covered area.

BACKGROUND

Surface runoff in vegetation-covered areas is an important part of surface water resources and also an important source of water resources in rivers and lakes. The monitoring of surface runoff yield characteristics of vegetation-covered areas is of great significance for the study of ecological hydrological processes, the evaluation and use of surface water resources, and agricultural production and ecological restoration. At present, the monitoring and evaluation of surface runoff yield in vegetation-covered areas are mainly focused on an overall scale of a watershed or region, while the research on a spatial pixel scale lacks necessary technical support. Traditional research mainly relies on the monitoring of a slope runoff pond based on a specific slope point line. The monitoring is time-consuming and unsustainable. It is affected by weather and human interference, and the monitoring results have large errors. The monitoring is carried out in a small region with a high cost and a long cycle, which makes it difficult to apply to large-scale monitoring and evaluation. Besides, the data is difficult to maintain due to the influence of weather. Long time series data is obtained after a long time of continuous monitoring, and the data can only reveal the runoff yield characteristics of a monitored slope, rather than to reveal a spatial difference. In addition, the slope point-based data does not support multi-scale spatial regional research. Therefore, in order to realize the dynamic evaluation of surface runoff yield on different temporal and spatial scales, it is urgently needed to establish a fast and efficient new method to estimate a surface runoff yield in a vegetation-covered area on a spatial pixel scale.

SUMMARY

An objective of the present invention is to provide a method for determining a surface runoff yield in a vegetation-covered area, which estimates the surface runoff yield in the vegetation-covered area fast and efficiently on a spatial pixel scale.

To achieve the above objective, the present invention provides the following solutions.

A method for determining a surface runoff yield in a vegetation-covered area, where the method includes obtaining climate data and spatial data. The climate data includes: annual rainfall; individual rainfall; vegetation coverage; leaf area index; snowmelt; average natural water content; and maximum water holding capacity. The spatial data includes: average maximum water holding depth per leaf area; litterfall accumulation; soil water storage; annual forest evapotranspiration; and annual grassland evapotranspiration. The climate data and spatial date are preprocessed to obtain preprocessed data.

A vegetation canopy interception water storage is calculated based on preprocessed average maximum water holding depth per leaf area, vegetation coverage and leaf area index.

A vegetation litterfall interception water storage is calculated based on preprocessed average natural water content, maximum water holding capacity and litterfall accumulation.

A maximum forest interception water storage is determined based on the vegetation canopy interception water storage, the vegetation litterfall interception water storage and preprocessed soil water storage.

A water conservation is determined based on the maximum forest interception water storage.

An annual total vegetation evapotranspiration is then determined by using Zhang's hypothesis based on preprocessed vegetation coverage, annual forest evapotranspiration and annual grassland evapotranspiration.

Finally, a vegetation runoff yield is determined based on the vegetation canopy interception water storage, the litterfall interception water storage, the water conservation, the annual total vegetation evapotranspiration and preprocessed annual rainfall and snowmelt.

According to the specific embodiments provided by the present invention, the present invention discloses the following technical effects.

The present invention improves and integrates a water conservation model with a Zhang's model based on remote sensing data. The present invention constructs a new method for calculating a surface runoff yield in a vegetation-covered area on a spatial pixel scale based on a water balance equation of the vegetation-covered area. This method utilizes real-time dynamic multi-temporal remote sensing data to avoid the traditional labor-consuming and expensive regional survey work with a long monitoring time and a heavy monitoring workload. It breaks through the limitation of traditional methods by data from meteorological and hydrological stations in a study area and overcomes the shortcoming of traditional point-based evaluation methods. The method realizes the long-term dynamic estimation of the surface runoff yield in regional and global vegetation-covered areas on a spatial pixel scale. It has the advantages of being efficient, fast, accurate, and applicable to large-scale vegetation-covered areas, and provides a new technical method support and theoretical idea for the research of ecological hydrological processes.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

FIG. 1 is a flowchart of a method for determining a surface runoff yield in a vegetation-covered area according to an embodiment of the present invention.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method for determining a surface runoff yield in a vegetation-covered area, which estimates the surface runoff yield in the vegetation-covered area fast and efficiently based on a spatial pixel scale.

In order to make the above objects, features, and advantages of the present invention more apparent, the present invention will be further described in detail in connection with the accompanying drawings and the detailed description.

FIG. 1 is a flowchart of a method for determining a surface runoff yield in a vegetation-covered area according to an embodiment of the present invention. As shown in FIG. 1, the method starts by obtaining climate data and spatial data (Step 101). The climate data includes: annual rainfall; individual rainfall; vegetation coverage; leaf area index; snowmelt; average natural water content; and maximum water holding capacity. The spatial data includes: average maximum water holding depth per leaf area; litterfall accumulation; soil water storage; annual forest evapotranspiration; and annual grassland evapotranspiration.

The soil water storage includes a soil moisture content at a depth of 0-10 cm, 10-40 cm, 40-100 cm and 100-200 cm. The data is derived from the FLDAS dataset (FLDAS Noah Land Surface Model L4 Global Monthly 0.1×0.1 degree (MERRA-2 and CHIRPS) V001 (FLDAS_NOAH01_C_GL_M) at GES DISC (https://ldas.gsfc.nasa.gov/FLDAS/)) of the National Aeronautics and Space Administration (NASA) (https://www.nasa.gov/), with a spatial resolution of 0.1°×0.1°. The time resolution is monthly and the spatial range covers the whole world (60S, 180W, 90N and 180E). In addition, global soil depth data is used to calculate a soil water content, which is derived from https://daac.ornl.gov/ (spatial resolution 0.1°×0.1°) and https://www.isric.org/explore/soilgrids (250 m×250 m, 1 km×1 km, 5 km×5 km, and 10 km×10 km). The latest administrative division vector data in 2015 is derived from the Resource and Environment Data Cloud Platform of the Chinese Academy of Sciences (http://www.resdc.cn/) and the National Bureau of Surveying, Mapping and Geographic Information (http://www.sbsm.gov.cn/article/zxbs/dtfw/). The leaf area index (LAI) data used to calculate the vegetation canopy interception water storage is derived from the medium-resolution MODIS13Q1NDVI dataset (https://www.nasa.gov) released by the National Aeronautics and Space Administration (NASA). Global land snowmelt data is derived from the Global Land Data Assimilation System (GLDAS) Goddard Earth Sciences Data and Information Services Center (GES DISC) (GLDAS Noah Land Surface Model L4 Monthly 0.25×0.25 degree) (https://mirador.gsfc.nasa.gov/). Land use and cover data is derived from the European Space Agency (ESA) (http://www.esa.int/ESA).

At the next step 102, the climate data and the spatial data is preprocessed data to obtain preprocessed data. The present invention utilizes a data assimilation method to convert a grid cell size of all raster data to the same scale. The projection method is all based on the Albers Equal Area Conic Projection (Krasovsky-1940-Albers). Global scale raster data is processed by format conversion, image correction, cropping and quality inspection to finally obtain a climate element dataset of a study area.

At the next step 103, a vegetation canopy interception water storage is calculated based on preprocessed average maximum water holding depth per leaf area, vegetation coverage and leaf area index.

Specifically, the following formula can be used:
CWS=f×LAI×$H_{SV}$, where CWS is the vegetation canopy interception water storage, mm; $H_{SV}$ is the average maximum water holding depth per leaf area, mm; f is the vegetation coverage; and LAI is the leaf area index.

At step 104, a vegetation litterfall interception water storage is calculated based on a preprocessed average natural water content, maximum water holding capacity and litterfall accumulation.

Specifically, the following formula can be used:
CIS=(0.085$R_m$−0.1$R_0$)×M, where CIS is the litterfall interception water storage, t/hm$^2$; $R_0$ is the average natural water content, g/kg; $R_m$ is the maximum water holding capacity, g/kg; and M is the litterfall accumulation, t/hm$^2$.

At step 105, a maximum forest interception water storage is determined based on the vegetation canopy interception water storage, the vegetation litterfall interception water storage and preprocessed soil water storage.

Specifically, the following formula can be used:

$$V_{max} = CWS + CIS + SMS$$
$$= f \times LAI \times H_{SV} + (0.085R_m - 0.1R_0) \times M + SMS$$

where $V_{max}$ is the maximum forest interception water storage, mm; CIS is the litterfall interception water storage, t/hm$^2$; SMS is the soil water storage, mm; $H_{SV}$ is the average maximum water holding depth per leaf area, mm; f is the vegetation coverage; LAI is the leaf area index; $R_0$ is the average natural water content, g/kg; $R_m$ is the maximum water holding capacity, g/kg; M is the litterfall accumulation, t/hm$^2$.

At step 106, a water conservation is determined based on the maximum forest interception water storage.

Specifically, the following formula can be used:

$$\begin{cases} Q_{WC} = V_{max} & P_i > V_{max} \\ Q_{WC} = P_i & P_i < V_{max} \end{cases},$$

where $V_{max}$ is the maximum forest interception water storage, mm; $Q_{WC}$ is the water conservation, mm; $P_i$ is the individual rainfall, mm.

At step 107, determine an annual total vegetation evapotranspiration is determined by using Zhang's hypothesis based on preprocessed vegetation coverage, annual forest evapotranspiration and annual grassland evapotranspiration.

Specifically, the following formula can be used:

$$ET_{veg} = f \cdot ET_f + (1-f)ET_h$$
$$= \left[ f \frac{1 + 2\frac{1410}{P}}{1 + 2\frac{1410}{P} + \frac{P}{1410}} + (1-f) \frac{1 + 0.5\frac{1100}{P}}{1 + 0.5\frac{1100}{P} + \frac{P}{1100}} \right] P$$

where $ET_{veg}$ is the annual total vegetation evapotranspiration; f is the vegetation coverage; $ET_f$ is the annual forest evapotranspiration, mm; $ET_h$ is the annual grassland evapotranspiration, mm; P is the annual rainfall, mm.

At step 108, a vegetation runoff yield is determined based on the vegetation canopy interception water storage, the litterfall interception water storage, the water conservation, the annual total vegetation evapotranspiration and preprocessed annual rainfall and snowmelt.

Specifically, the following formula is used:

$R_{veg}=Q_{SN}+P-Q_{WC}-ET_{veg}$, where $R_{veg}$ is the runoff yield of the vegetation-covered area, mm; CWS is the vegetation canopy interception water storage, mm; CIS is the litterfall interception water storage, t/hm²; P is the annual rainfall, mm; $Q_{SN}$ is the snowmelt, mm; $Q_{WC}$ is the water conservation, mm; $ET_{veg}$ is the annual total vegetation evapotranspiration, mm.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A method for determining a surface runoff yield in a vegetation-covered area, comprising steps of:

measuring climate data and spatial data, wherein the climate data comprises: annual rainfall, individual rainfall, vegetation coverage, leaf area index, snowmelt, average natural water content and maximum water holding capacity; the spatial data comprises: average maximum water holding depth per leaf area, litterfall accumulation, soil water storage, annual forest evapotranspiration and annual grassland evapotranspiration;

preprocessing the climate data and the spatial data to obtain preprocessed data, the preprocessing comprising converting a grid cell size of all raster data to a same scale to generate uniformly scaled global scale raster data, the global raster data being utilized to generate a climate element dataset of a study area by at least one of format conversion, image correction, cropping, and quality inspection;

calculating a vegetation canopy interception water storage based on a preprocessed average maximum water holding depth per leaf area, vegetation coverage and leaf area index;

calculating a vegetation litterfall interception water storage based on a preprocessed average natural water content, maximum water holding capacity and litterfall accumulation;

determining a maximum forest interception water storage based on the vegetation canopy interception water storage, the vegetation litterfall interception water storage and preprocessed soil water storage;

determining a water conservation based on the maximum forest interception water storage;

determining an annual total vegetation evapotranspiration by using Zhang's hypothesis based on preprocessed vegetation coverage, annual forest evapotranspiration and annual grassland evapotranspiration; and determining a vegetation runoff yield based on the vegetation canopy interception water storage, the litterfall interception water storage, the water conservation, the annual total vegetation evapotranspiration and preprocessed annual rainfall and snowmelt.

2. The method for determining a surface runoff yield in a vegetation-covered area according to claim 1, wherein the calculating a vegetation canopy interception water storage based on preprocessed average maximum water holding depth per leaf area, vegetation coverage and leaf area index uses the following formula:

$CWS=f \times LAI \times H_{SV}$, wherein CWS is the vegetation canopy interception water storage; $H_{SV}$ is the average maximum water holding depth per leaf area; f is the vegetation coverage; LAI is the leaf area index.

3. The method for determining a surface runoff yield in a vegetation-covered area according to claim 1, wherein the calculating a vegetation litterfall interception water storage based on preprocessed average natural water content, maximum water holding capacity and litterfall accumulation uses the following formula:

$CIS=(0.085R_m - 0.1R_0) \times M$, wherein CIS is the litterfall interception water storage; $R_0$ is the average natural water content; $R_m$ is the maximum water holding capacity; M is the litterfall accumulation.

4. The method for determining a surface runoff yield in a vegetation-covered area according to claim 1, wherein the determining a maximum forest interception water storage based on the vegetation canopy interception water storage, the vegetation litterfall interception water storage and preprocessed soil water storage uses the following formula:

$$V_{max} = CWS + CIS + SMS \\ = f \times LAI \times H_{SV} + (0.085R_m - 0.1R_0) \times M + SMS$$

wherein $V_{max}$ is the maximum forest interception water storage; CIS is the litterfall interception water storage; SMS is the soil water storage; $H_{SV}$ is the average maximum water holding depth per leaf area; f is the vegetation coverage; LAI is the leaf area index; $R_0$ is the average natural water content; $R_m$ the maximum water holding capacity; M is the litterfall accumulation.

5. The method for determining a surface runoff yield in a vegetation-covered area according to claim 1, wherein the determining a water conservation based on the maximum forest interception water storage uses the following formula:

$$\begin{cases} Q_{WC} = V_{max} & P_i > V_{max} \\ Q_{WC} = P_i & P_i < V_{max} \end{cases},$$

wherein $V_{max}$ is the maximum forest interception water storage; $Q_{WC}$ is the water conservation; $P_i$ is the individual rainfall.

6. The method for determining a surface runoff yield in a vegetation-covered area according to claim 1, wherein the determining an annual total vegetation evapotranspiration by using Zhang's hypothesis based on preprocessed vegetation coverage, annual forest evapotranspiration and annual grassland evapotranspiration uses the following formula:

$$ET_{veg} = f \cdot ET_f + (1-f)ET_h \\ = \left[ f \frac{1 + 2\frac{1410}{P}}{1 + 2\frac{1410}{P} + \frac{P}{1410}} + (1-f) \frac{1 + 0.5\frac{1100}{P}}{1 + 0.5\frac{1100}{P} + \frac{P}{1100}} \right] P$$

wherein $ET_{veg}$ is the annual total vegetation evapotranspiration; f is the vegetation coverage; $ET_f$ is the annual forest evapotranspiration; $ET_h$ is the annual grassland evapotranspiration; P is the annual rainfall.

7. The method for determining a surface runoff yield in a vegetation-covered area according to claim 1, wherein the determining a vegetation runoff yield based on the vegetation canopy interception water storage, the litterfall interception water storage, the water conservation, the annual total vegetation evapotranspiration and preprocessed annual rainfall and snowmelt uses the following formula:

$R_{veg}=Q_{SN}+P-Q_{WC}-ET_{veg}$, wherein $R_{veg}$ is the runoff yield of the vegetation-covered area; CWS is the vegetation canopy interception water storage; CIS is the litterfall interception water storage; P is the annual rainfall; $Q_{SN}$ is the snowmelt; $Q_{WC}$ is the water conservation; $ET_{veg}$ is the annual total vegetation evapotranspiration.

* * * * *